United States Patent [19]
Jean et al.

[11] 3,777,107
[45] Dec. 4, 1973

[54] ELECTRICAL WELDING MACHINE

[75] Inventors: Pierre Jean, Fontaine-La-Mallet; Marcel Nias, Nantes, both of France

[73] Assignees: Gaz Transport, Paris; Etudes Et Realisations Industrielles, Nantes, France

[22] Filed: Mar. 9, 1972

[21] Appl. No.: 233,050

[30] Foreign Application Priority Data
March 12, 1971  France ......................... 7108657
Feb. 24, 1972  France ......................... 7206200

[52] U.S. Cl. .................. 219/82, 219/125 R, 228/44
[51] Int. Cl. ........................................... B23k 11/06
[58] Field of Search ................... 219/81, 82, 83, 59, 219/64, 67, 102, 104, 124, 125 R; 228/44

[56] References Cited
UNITED STATES PATENTS

| | | | |
|---|---|---|---|
| 3,264,446 | 8/1966 | Gronlund | 219/81 X |
| 3,412,448 | 11/1968 | Landberg | 219/81 X |
| 2,784,299 | 3/1957 | Matthes | 219/102 |
| 3,167,636 | 1/1965 | Bosteels | 219/125 R |
| 3,045,106 | 7/1962 | Ballard et al. | 219/82 X |
| 2,151,422 | 3/1939 | Ganahl | 219/81 |
| 3,250,890 | 5/1966 | Denis et al. | 219/82 |

Primary Examiner—J. V. Truhe
Assistant Examiner—L. A. Schutzman
Attorney—Joseph F. Brisebois et al.

[57] ABSTRACT

In an electrical welding machine adapted to weld flanges gripped between a pair of welding rollers, each welding roller is mounted on a pivotally mounted shaft, and the welding machine is driven by a pair of driving rollers adapted to grip the flanges, the driving rollers being mounted on pivotally mounted driving shafts which, when in driving position, are canted slightly toward the direction in which the machine travels, so that the machine is urged constantly toward the plates from which said flanges project.

23 Claims, 10 Drawing Figures

ELECTRICAL WELDING MACHINE

SUMMARY OF THE INVENTION

It is frequently necessary to fasten together sheets which are positioned side by side. This is particularly the case during the manufacture of fluid-tight tanks such as those used for transportation of light liquefied hydrocarbons at low temperatures. Such sheets may be provided with flanges along their edges, which flanges are then electrically welded together.

It has already been proposed that the machines used for such welding be provided with serrated welding rollers which bear on opposite sides of the flanges to be welded and roll along the line to be welded. In order to make these welding machines easier to handle it is already known to separate them from the transformer required to supply the welding roller with electric current. It has also been suggested that, in order to improve the quality of the weld produced and the conditions under which the welding is carried out, the welding current supplied to the rollers should be so modulated that the current passes through them for certain brief intervals of time spaced by comparable intervals of time. As the welding machine moves along the line to be welded the resulting welded zones are so arranged that two adjacent zones partially overlap. This results in a continuous welded line while substantially facilitating the cooling of the welding rollers, since the current passes therethrough only for short intervals.

In the devices heretofore known the welding machine is either advanced manually, in which case the machine is moved by the user and guided by him along the line of welding, or the machine is driven by welding rollers which also act as driving rollers and thus serve simultaneously two distinct functions.

It is obvious that since a welding machine is fairly heavy, if the weld is to be made along a vertical joint or a ceiling joint it is particularly important to hold the machine firmly pressed against the plates in such a manner as to ensure welding of the flanges. It has already been suggested that, for this purpose, the axes of the welding rollers be inclined with respect to the plates to be welded so that these rollers have a tendency to roll toward the plane of the plates to be connected to each other, but which they are prevented from striking by suitable protective rollers so that, at the point of contact between the welding rollers and the flanges of the plates to be welded there is a sliding frictional movement in a direction at an angle to the tangent to the circle of contact between the rollers and the point at which welding is taking place. The welding rollers are generally made of copper and substantial friction between the surfaces of the highly heated rollers and the flanges to which they are applied with a certain pressure necessarily results. This has a disastrous effect on the longevity of the material because it damages the surface of the copper so that the rollers are very rapidly worn out and can no longer operate satisfactorily, especially if a substantially constant pressure between the rollers is desired.

It is the object of the present invention to mitigate the aforesaid disadvantages by providing a welding machine utilizing a separate transformer which is adapted to be advanced along the joints to be welded and guide itself along these joints, regardless of their position, without causing any premature wear of the welding rollers, while they maintain a constant pre-established pressure therebetween.

It is accordingly an object of the present invention to provide as a new article of manufacture an electrical welding machine supplied with welding current by a separate transformer connected to said machine by a flexible cable, said machine being adapted to weld the flanges of adjacent plates, while said flanges are gripped between the rotating welding rollers, and being characterized by the fact that it comprises, on the one hand, at least two welding rollers positioned on opposite sides of flanges to be welded, said rollers having an axis which is substantially perpendicular to the plates to be welded, each of said rollers being fixed to one of a pair of opposed jaws, the two jaws being pivotally mounted about an axis and adapted to be actuated by any suitable hydraulic or pneumatic means, so as to create a gripping zone at the level of the welding rollers. Said machine also comprises, on the other hand, at least one pair of drive rollers positioned on opposite sides of the flanges to be welded together, said driving rollers having their axes inclined toward the front of the machine, that is to say, in the direction in which it advances in a plane perpendicular to the plates to be assembled, and being driven in rotation at the same speed but in opposite directions. Each of these two driving rollers is attached to one of said jaws, which are mounted to pivot about an axis and operable, for example manually, through appropriate means, to provide a gripping zone at the level of the driving rollers.

In a first embodiment, the welding rollers are mounted to rotate freely about their axes. In a second embodiment, the two welding rollers of at least one pair of welding rollers are rotatably driven at a peripheral speed substantially equal to or slightly less than that of the driving rollers.

In a preferred construction which may be adopted in the case of either of the two preceding embodiments, the machine according to the invention is supplied through its associated transformer with a modulated current, on an intermittent basis, the intervals of time during which current is supplied and cut off having a duration of about 20 milliseconds. The machine comprises two pairs of driving rollers, between which a pair of welding rollers is positioned. The inclinations of the axes of the four driving rollers with respect to a plane perpendicular to the plates to be welded are equal. The jaws to which the four driving rollers and the two welding rollers are attached are mounted to pivot about the same axis parallel to the sheets to be welded. The machine rides on the sheets to be welded through supporting rollers which turn freely about their axes. These axes are substantially parallel to the plates and perpendicular to the flanges to be welded. The axis about which the jaws carrying the driving rollers and the welding rollers pivot is a shaft rotatably driven either directly by the drive shaft of an electric motor or indirectly through a flexible cable and reduction gearing. The shaft actuating the jaws is driven through a flexible cable at a speed reduction between the flexible cable and the shaft of between 1.5 to 1 and 3 to 1. The two driving rollers of each pair are driven by a wormscrew mounted on the shaft about which they are pivoted and which cooperates with two gears on opposite sides of said shaft, the teeth of which are inclined to compensate for the inclination of the axes of the driving rollers. Each of these gears drives one of the driving rollers of the pair. The driving rollers are caused to grip the joints formed by the flanges of the sheets by a manually operated eccentric device which comprises resilient means providing a resilient gripping action. A spring also separates the rollers when the gripping action is terminated. The gripping device for the driving rollers acts simultaneously upon both pairs of driving rollers. The welding rollers are caused to grip the opposite side of the flanges to be welded together by pneumatic or hydraulic control means. This pneumatic or hydraulic control means may comprise a single-acting hydraulic jack, with a spring separating the serrated rollers when the gripping action is to be terminated, or a double-acting hydraulic jack. Each welding roller is peripherally cooled by an inner channel, the cooling circuits of the serrated rollers being connected in parallel with the general cooling circuit of the machine.

The electrical contact between each shaft carrying a welding roller and the stationary sleeve in which said shaft turns, is provided by a rotating sleeve consisting, for example, of graphite. The pair of driving rollers behind the welding rollers from the point of view of its direction of advance is provided with a cooling circuit which consists of a water jacket surrounding the axis of each of said driving rollers for part of its length.

Considering the realization corresponding to the first embodiment mentioned in the forehead, the rotating shaft of each welding roller is advantageously mounted within a sleeve fastened on a yoke like gripper jaw; the central part of the yoke supports the articulation bearings on the rotating shaft of the gripper and the sidewalls of the yoke support pulleys to ensure the relative movement of the gripper jaws; said both yokes have a common median plane perpendicular to the rotating shaft and they each support, on each side of the common median plane, a pulley, which shaft is perpendicular to said plane, both pulleys disposed on the same side of the median plane cooperating with a third pulley carried by a slider bar and operating with this third pulley as a pulley block; a pneumatic means adjusts the relative position of said slider bar and the rotating shaft; the said slider bar moves inside holes arranged in the sidewalls of a standstill porch carried by the rotating shaft of the gripper jaws.

The rotating shaft for each welding roller of a pair of rollers is advantageously mounted in a journal box fixed to a movable jaw. One of these journal boxes is connected to the movable piston of a fluid-operated jack and the other to the cylinder of said jack. The welding rollers are driven in rotation by gears fixed to the shafts about which they rotate, said gears being positioned on opposite sides of a worm carried by the common pivotal axis of the supports for the welding rollers and the driving wheels.

It will be seen that, in the machine according to the invention, the movement of the machine is caused principally by the driving rollers which do not directly cooperate in the welding step. It follows that the driving rollers may be, without difficulty, inclined with respect to a direction perpendicular to the plates to be welded since there is no substantial release of heat at their points of contact with the flanges to be welded so that they may resist substantial friction. The inclination of the two pairs of welding rollers makes it impossible to urge the machine against the plates to be welded and on which they are supported by supporting rollers at the ends of the machine. Moreover, the welding rollers are parallel to the plane of the plates to be welded and roll substantially without sliding along the flanges thereon which are to be welded together, so that there is no friction, but only a rolling contact between the flanges to be welded and the welding rollers at the points of contact. It follows that the wear on the welding rollers is practically zero. The pneumatically controlled gripping means ensures a constant pressure by the welding rollers on opposite sides of the flanges to be welded so as to provide optimum conditions for effectuating the welding through these rollers. It should be emphasized that the welding rollers are cooled by an internal peripheral duct which is particularly efficacious and causes the machine to operate very satisfactorily. Moreover, the fact that the rear driving rollers of the machine are cooled makes it possible to eliminate the disadvantages which might result from the passage of these driving rollers over a zone which has just been heated by the welding rollers.

In order that the invention may be better understood a preferred embodiment thereof will now be described, purely by way of illustration and example, with reference to the accompanying drawings, in which.

Figure 1:
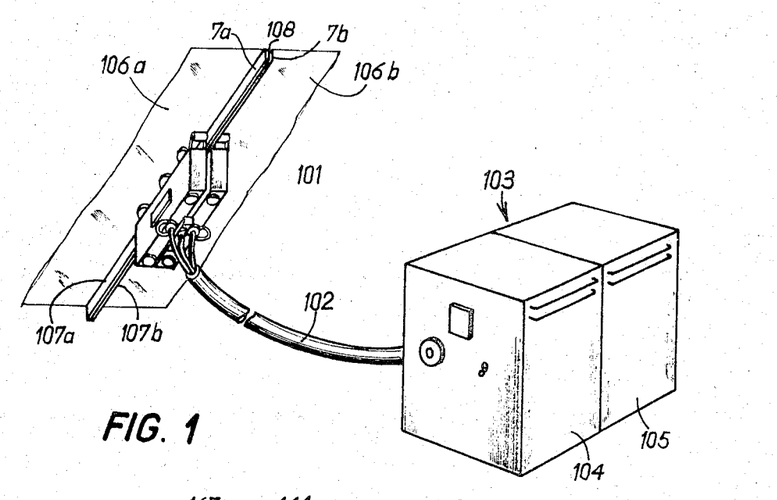
FIG. 1 is a perspective view of the welding machine according to the invention as a whole, showing it in operation welding together the adjacent flanges of two ceiling plates.

Referring now to the drawing, it will be seen that reference numeral 101 indicates the welding machine according to the invention as a whole. The machine 101 is connected by a flexible cable 102 to a stationary control device 103 which comprises a transformer 104 adapted to furnish the desired welding current and a pneumatic and electrical control box 105. The machine 101 is adapted to weld the sheets 106a–106b which lie in the same plane and are provided with flanges 107a–107b respectively. A tongue of metal 108 is positioned between the two flanges 107a and 107b, which tongue is adapted to attach the sheets to a supporting structure.

The flanges 107a and 107b are welded together by serrated welding rollers 109 (FIG. 5) consisting of two copper discs having a chamfered edge. The two serrated welding rollers 109 are positioned opposite each other on opposite sides of the assembly formed by the two flanges 107a–107b and the tongue 108. Each welding roller 109 is attached by four pins 110 to a shaft 111 which rotates in a bearing 112. The cylindrical upper surface of the shaft 111 is provided with two helical channels 113 and 114 the median lines of which are helices spaced 180° from each other. The helical channels 113 and 114 are connected at their lower ends by a groove. The channel 113 leads at its upper end to a radial channel 115 connected by an annular passage 116 to a radial duct 117, a peripheral groove 118, and an exhaust duct 119. The helical groove 114 is connected by a radial duct 120 to a duct 121 parallel to the axis of the serrated roller 109. The duct 121 is connected at its upper end to a supply duct 122. The supply duct 122 also feeds a duct 123 positioned axially of the serrated roller 109. The duct 123 is in the center of the annular passage 116.

Figure 8:
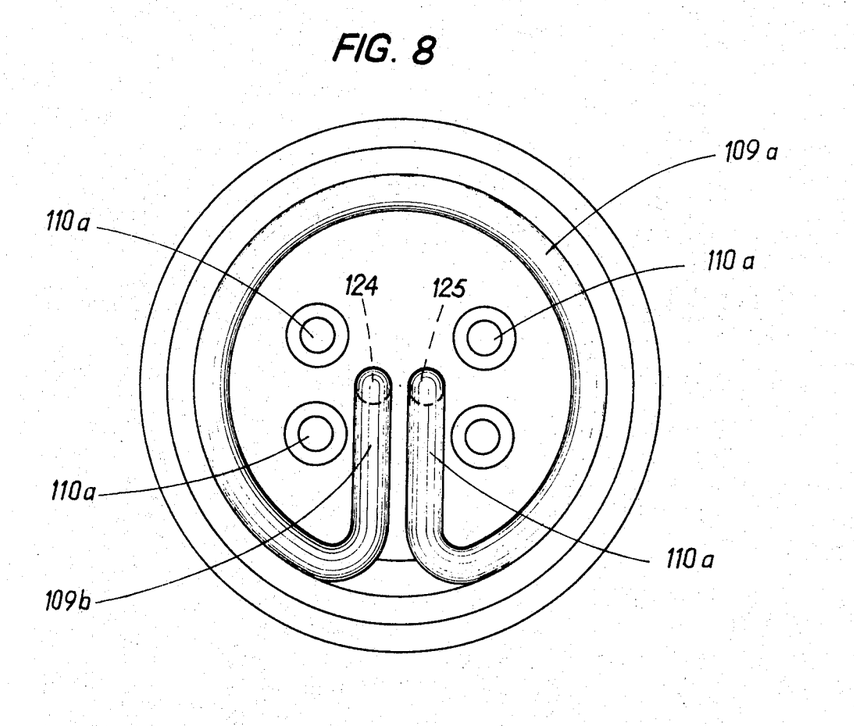
FIG. 8 is a schematic bottom view of a welding roller according to the invention.
Figure 9:
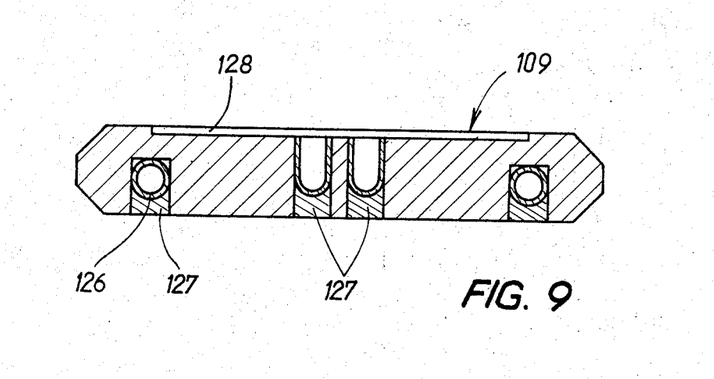
FIG. 9 is a detail view showing a welding roller for the machine according to the invention in axial section.

The serrated roller 109 is made from a disk the lower surface of which is shown on FIG. 8. This disk comprises, in addition to four bores 110a adapted to receive the pins 110, a peripheral groove 109a which communicates through two substantially radial return grooves 109b with two bores 124, 125 parallel to the axis in the central zone of the serrated roller. A tube 126 is positioned in the peripheral groove 109a and in the radial grooves 109b. The two ends of this tube enter the bores 124 and 125. The tube 126 is held in the grooves of the disk 109 by silver brazing 127. The upper surface of the serrated roller 109 is provided with a centering seat 128 inside which there is a disk 129 (FIG. 5) which has two central bores 124a and 125a in alignment with the bores 124 and 125 and the corresponding ends of the tube 126. An annular sealing member 130 is mounted in the surface of the disk 129 remote from the serrated roller 109 and encircles the bores 124a and 125 a. The bore 125a is connected at one end to one end of the tube 126 and at the other to the tube 123. The bore 124a is connected at one end to the other end of the tube 126 and at the other end to the annular duct 116.

The externally grooved part of the rotating shaft 111 of the serrated roller 109 is enclosed in a metallic sleeve 131 which covers the grooves 113 and 114. The upper part of the rotating shaft 111 turns in a cap 132 which carries the supply ducts 122 and exhaust ducts 119. Two annular sealing members 133-134 are positioned on opposite sides of the peripheral groove 118 inside the cap 132. A ring 135 perpendicular to the axis of the shaft 111 is screwed onto the upper part of said shaft. It cooperates with a ring 200, one edge of which bears on the corresponding edge 201 of the cap 132. The ring 200 is attached to the ring 135 by screws 202. The sleeve 112 is axially gripped between an edge 111a of the shaft 111 which bears against its lower surface and the mounting bracket 203 of yoke 204 which mounting bracket bears against its upper surface. Between the ring 135 and the mounting bracket 203 the shaft 111 carries a helical gear 205 which is fixed to the shaft 111 but is electrically insulated therefrom by an insulating sleeve 206 and two insulating washers 207 positioned above and below the gear 205. The gear 205 drives the shaft 111 about its axis and a self-lubricating washer 208 is therefore provided between the lower disc 207 and the mounting tab 203. The stack of components which has just been described is axially gripped between the threaded ring 135 and a flange on the shaft 111.

Figure 3:
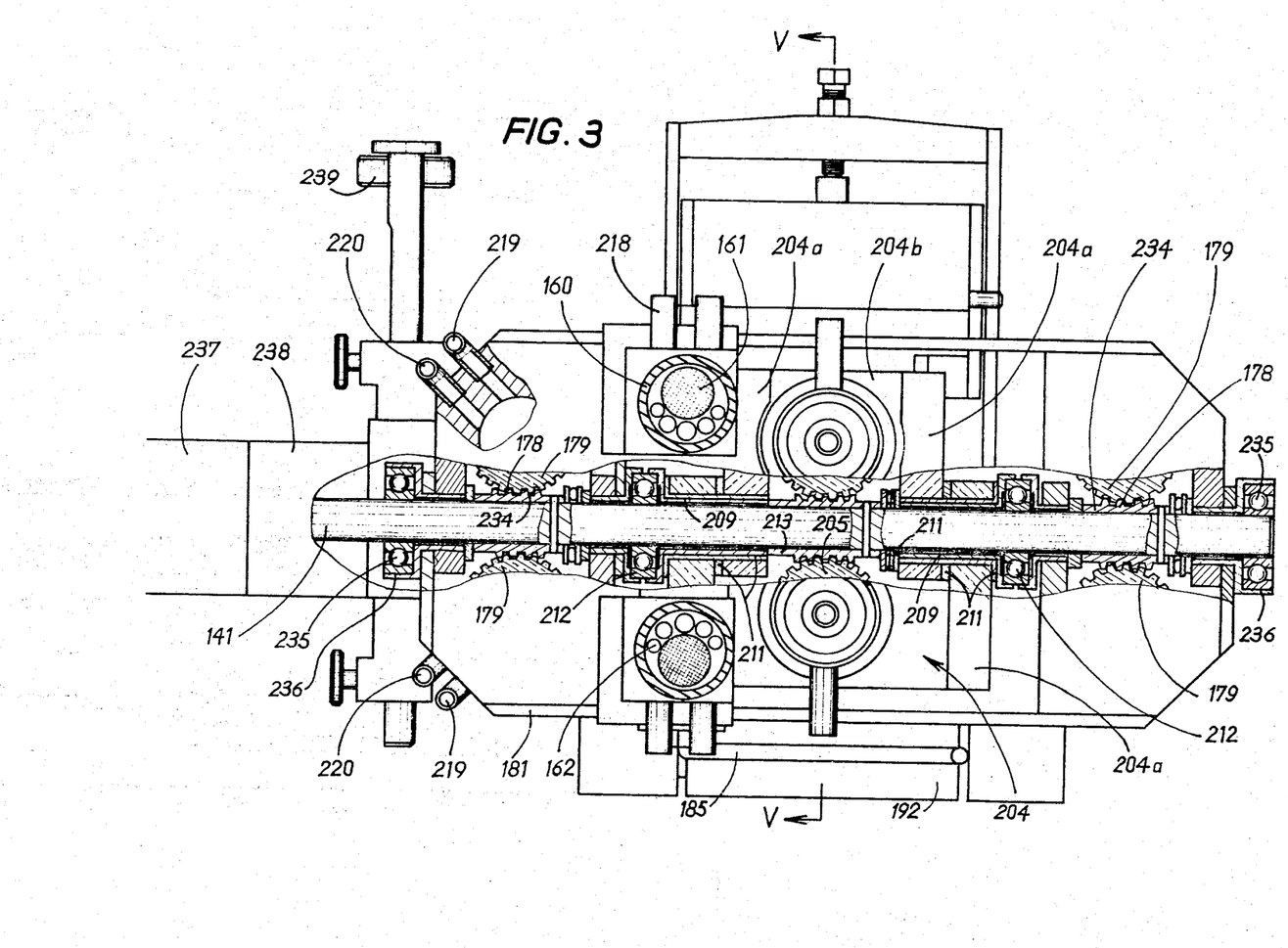
FIG. 3 is a top plan view of the machine of FIG. 2, with portions of the machine broken away.

Each sleeve 112 is mounted on the mounting bracket 203 of a yoke 204 comprising two arms 204a connected to each other by a central part 204b, (FIG. 3). The two yokes 204 of the machine are provided with bores in the four arms 204a thereof for mounting the two yokes on a single pivotal axis 141. The two arms of one of the yokes 204 are gripped between the two arms of the other yoke 204 as best seen in FIG. 3. The yokes 204 are mounted on the shaft 141 by a self-lubricating sleeve 209 and an electrically insulating sleeve 210. Moreover the yokes 204 are electrically insulated from each other and from the shaft by means of washers 211 perpendicular to the shaft 141. One of the ends of each sleeve 209 is fixed to the outer cage of a ball bearing race 212, the inner cage of which is supported by the shaft 141. Between the two sleeves 209, a sleeve 213 is mounted on the shaft 141. This sleeve carries a worm gear adapted to cooperate with two helical gears 205 carried by the two shafts 111 of the welding rollers 109. These two gears are positioned on opposite sides of the sleeve 213 perpendicular to the axis thereof.

Figure 4:
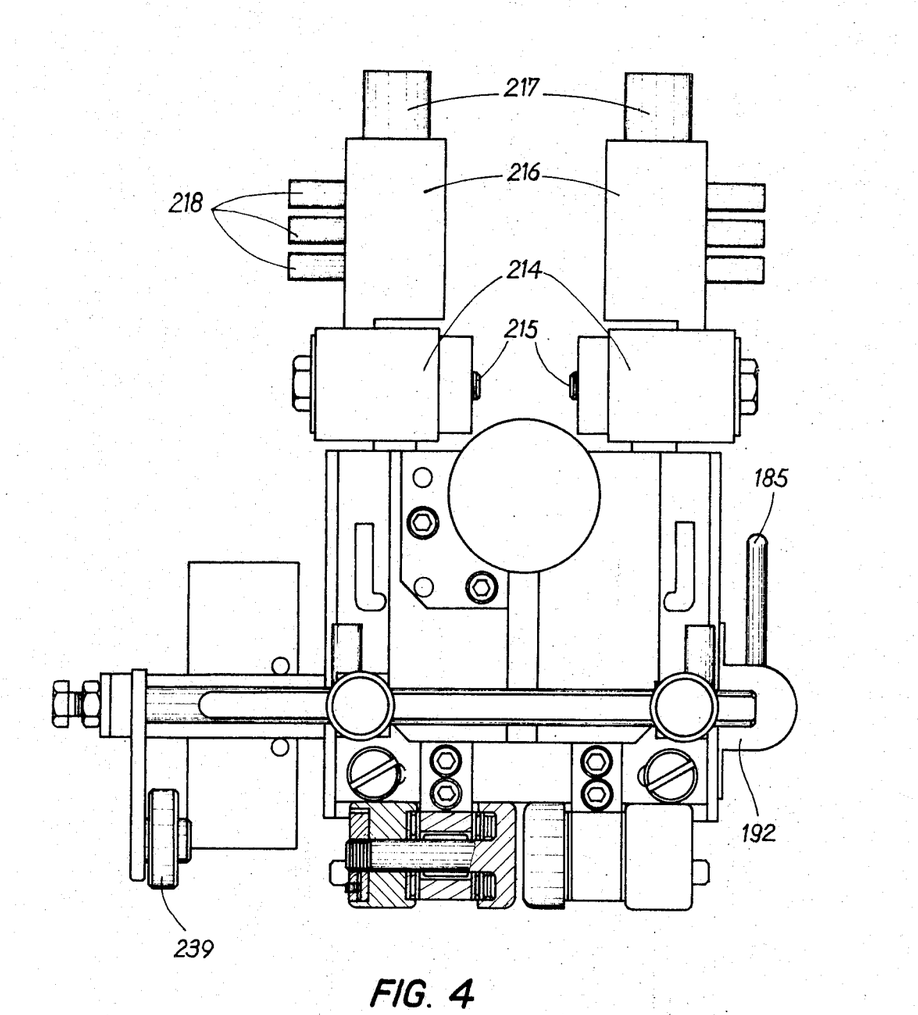
FIG. 4 is a transverse sectional view taken along the line IV—IV of FIG. 2, with certain parts shown in section.
Figure 5:
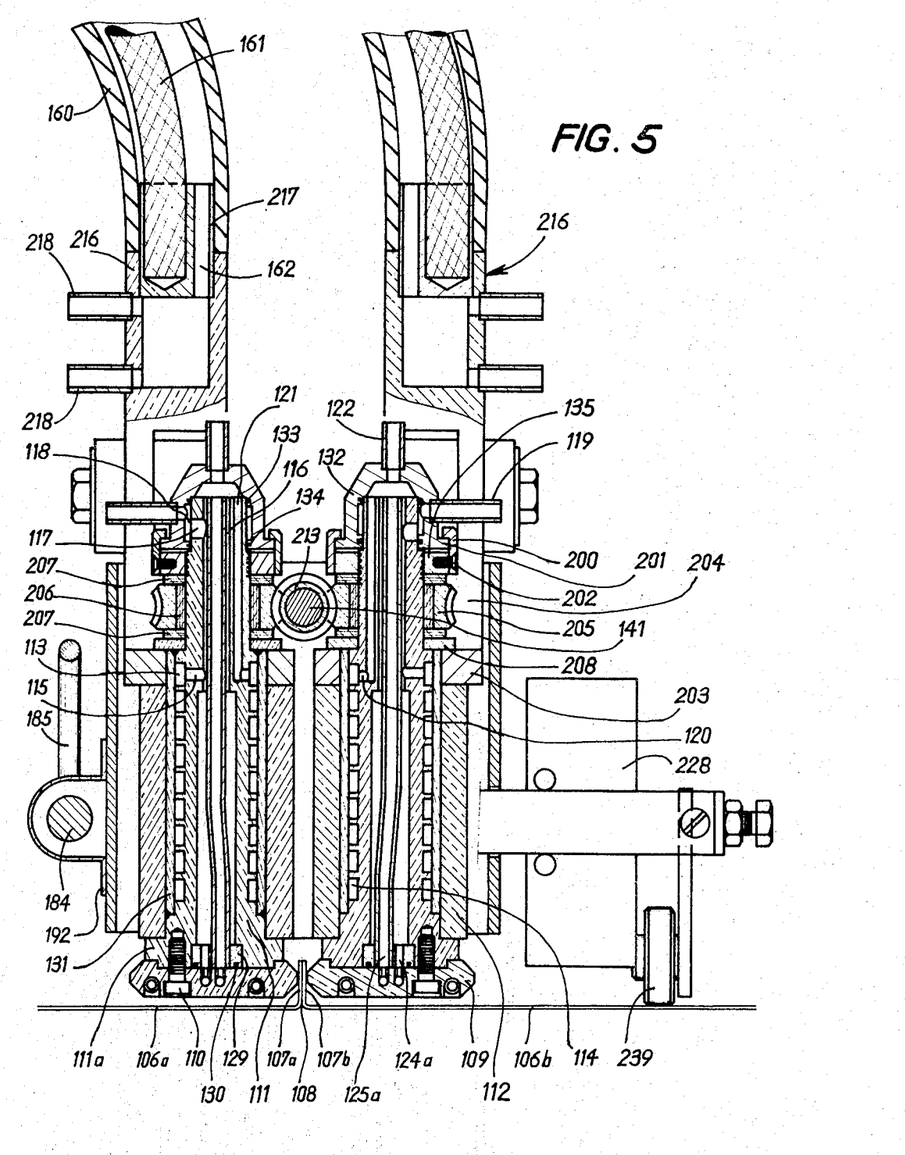
FIG. 5 is a section taken along the line V—V of FIG. 3.
Figure 10:
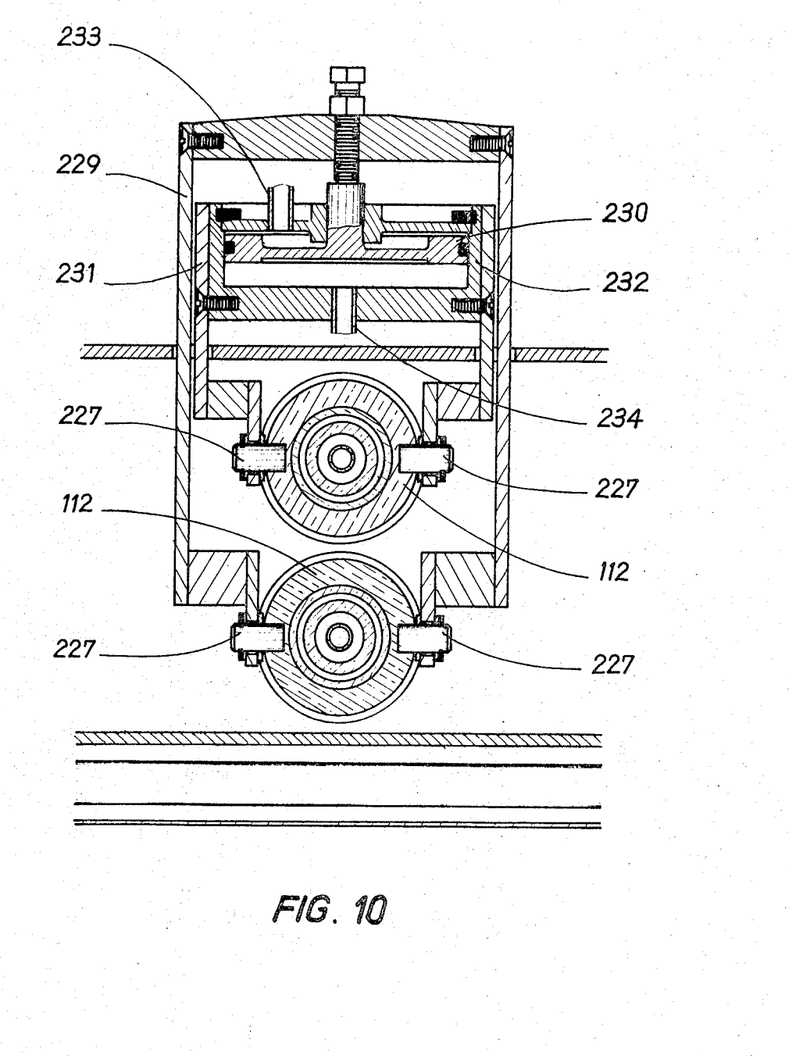
FIG. 10 is horizontal sectional view taken through the yoke 229.

Each yoke 204 is connected by a block 214 and a bolt 215 (FIG. 4) to a junction member 216. The junction member 216 comprises a tube 217 to which a fluid-tight rubberized sleeve 160 may be attached. In this sleeve 160 is an electrically conductive braid 161, which braid is immersed in the water utilized to cool the machine. The cooling water passes from the bottom of the tube 217 through the orifices 162. It leaves or re-enters the junction member 216 through three ducts 218, to which flexible tubes are connected. One of the fluid tight sleeves 160 conducts the cooling water from a pump 164 and the corresponding ducts 218 are connected by flexible ducts 165 on the one hand to the two supply ducts 122 and on the other hand to the two ducts 219 which will be hereinafter described. The other fluid tight sleeve 160 exhausts the cooling water which has served its purpose and the corresponding ducts 218 are connected on the one hand to the outlet ducts 119 and on the other hand to the outlet ducts 220 which will be hereinafter described, said connections being made through flexible tubes. The sleeves 112 of the welding rollers each have three diametrically opposed projections 227 (FIG. 10) which are substantially parallel to the longitudinal median plane of the machine. The two projections 227 associated with a single sleeve 112 are connected by a yoke to one of the members of a double-acting hydraulic jack 228. Reference numeral 229 indicates the yoke which is connected to the piston 230 of the jack 228 and 231 indicates the yoke which is connected to the cylinder of the jack 228. The jack 228 is supplied either through the duct 233 or through the duct 234 depending upon whether the piston is to be displaced in one direction or the other within the cylinder 232. The yoke 229 lies in substantially the same plane as the yoke 231 and its arms completely embrace the yoke 231. FIG. 10 shows how the hydraulic cylinder 228 is supplied through the duct 233 so as to separate the two sleeves 112. The relative displacement of the two sleeves results from rotation of the yokes 204 about their pivotal axis 141 (FIG. 5).

After having thus described the welding rollers of the machine according to the invention, the driving rollers which advance the machine along the flanges to be welded together will now be described, with particular reference to FIG. 2. Each driving roller 171 consists of a disk fixed to a shaft 172 which rotates inside a sleeve 173. At the top and bottom of the shaft 172 between the sleeve 173 and the shaft 172 are ball bearings 174. The roller 171 is attached to the shaft 172 by screws 221. The ball bearings 174 at the top of each shaft 172 are surmounted by a sleeve 222 above which is a helical gear 179 fixed to the shaft 172 by a key 223. The axial position of the gear 179 on the shaft 172 is determined by a threaded nut 224. The gear 179 is positioned in a recess 225 in the upper part of the sleeve 173, the shaft 172 being positioned in a bore provided for this purpose substantially axially of the sleeve 173. A protective plate 226 covers the recess 225.

Figure 2:
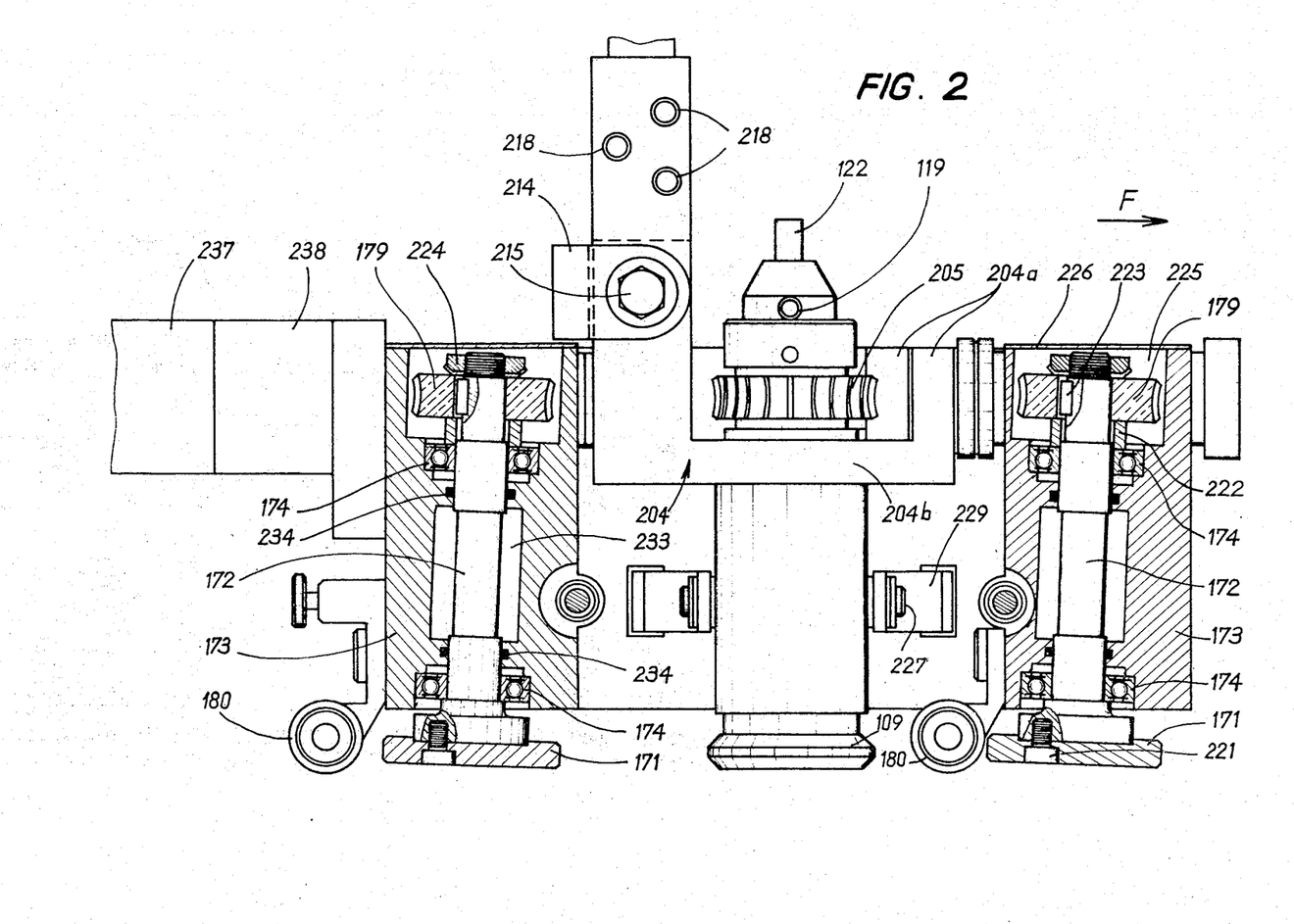
FIG. 2 is an elevational view partly in section of the machine according to the invention.

The drive rollers 171 which are positioned behind the welding rollers 109 from the point of view of the direction of advancement of the machine indicated by the arrow F on the FIG. 2, are provided with cooling means for improving the operation of the machine by decreasing the wear on the rollers 171. In effect, these rollers bear on flanges which have been subjected to a welding operation and are consequently at a high temperature. The cooling means comprises a chamber 233 between the sleeve 173 and the central part of the shaft 172, the chamber 233 being supplied through a duct 219, and the cooling water being exhausted through a duct 220. Annular sealing members 234 are provided which encircle the shaft 172 on opposite sides of the chamber 233.

The two sleeves 173 of a pair of drive rollers 171 are mounted to swing about the shaft 141. The shaft 141 carries a worm 178 the threads of which engage the teeth of two helical gears 179 carried by the shafts 172. The two gears 179 are positioned opposite each other on opposite sides of the worm screw 178. Since the axes of the shafts 172 and the rollers 171 are inclined by 4 degrees with respect to the perpendicular to the plates 106a–106b, it has been necessary to incline the teeth of the gears 179 by 4 percent with respect to the teeth of a normal gear. The fact that they are driven by the screw 178 makes it possible to rotate the two drive rollers 171 of a single pair at two strictly equal speeds of rotation in opposite directions.

The worm screw 178 is mounted on the shaft 141 by means of a sleeve 234 which is keyed to the shaft 141. Two ball bearings 235 are provided at the ends of the shaft 141 and are supported through sleeves 236, by the sleeves 173 of the two pairs of driving rollers positioned on opposite sides of the welding rollers 109 in the zone in which these sleeves pivot about the shaft 141. The shaft 141 is driven from one end by an electric motor 237 associated with reduction gearing 238. If exactly the same mounting is used to drive the two pairs of rollers 171 it is obvious that the shaft 141 will drive the two pairs of driving rollers 171 at the same speed. Simultaneously, the shaft 141 also drives the welding rollers 109 at a slightly smaller peripheral speed. Since the axis of the rollers 171 is inclined toward the front of the machine from the point of view of the direction of advancement imparted by the rotation of the rollers 171, this machine will not only advance along the flanges which are to be welded, which is gripped between the two pairs of drive rollers 171, but will also have a tendency to approach the plates 106a–106b because of the oblique rolling of the rollers 171. The pressure of the machine on the plates 106a, 106b is sustained by rollers 180. The rollers 180 have their axes substantially parallel to the plate 106a–106b and perpendicular to the flanges 107a–107b. Each sleeve 173 supports a roller 180. The rollers 180 associated with the sleeve 173 behind the welding rollers 109 from the point of view of the direction of travel, are positioned toward the outside of the machine as compared with the corresponding drive rollers 171. On the contrary, the rollers 180 associated with the drive rollers at the front of the machine are positioned between said front drive rollers 171 and the welding rollers 109.

The machine also rests on the plates to be welded 106b through a roller 239 laterally mounted on an adjustable sliding rod.

Figure 6:
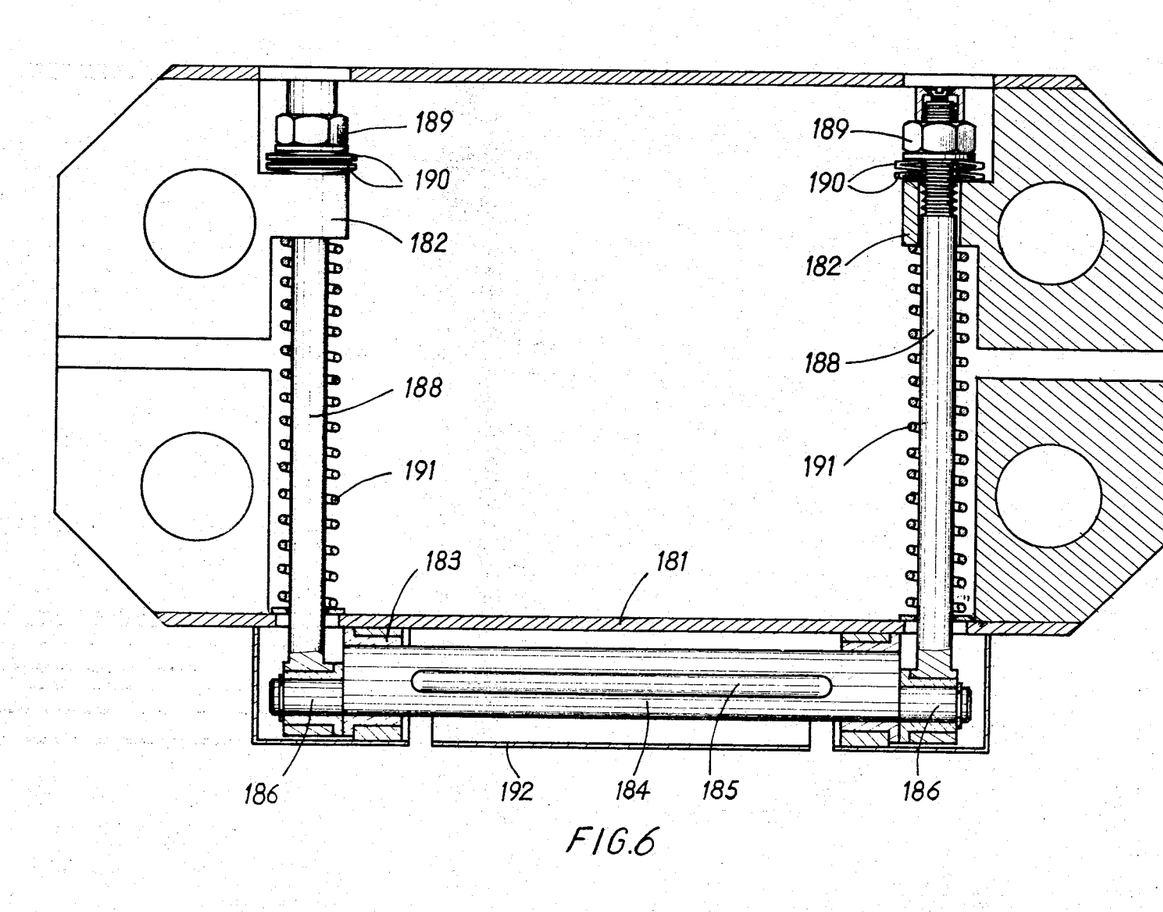
FIG. 6 is a plan view showing the manual control device for controlling the gripping and release of the driving rollers, said device being presumed to be separated from the rest of the machine.

In order to satisfactorily drive the machine through the rollers 171 it is necessary for these rollers to grip the opposite sides of the flanges 107a–107b with a certain pressure. For this purpose the two sleeves 173 on the same side of a joint to be welded are connected by means of a plate 181 (FIG. 3). As best seen in FIG. 6 the two other sleeves are provided with brackets 182 opposite the sleeves 112 of the welding rollers. The brackets 182 are provided with a bore the axis of which is perpendicular to the joint to be welded. Two bearings 183 are mounted on the connecting plate 181 and a shaft 184 attached to a handle 185 turns inside these bearings. The shaft 184 carries at its two ends an eccentric pin 186, the axes of the two pins being aligned. The pins 186 may rotate inside the bearings 187, each bearing being attached to a rod 188 which passes through a bracket 182. The ends of the rods 188 are threaded and cooperate with a nut 189 which rests on the corresponding bracket 182 through two resilient washers 190. A helical spring 191 mounted on each rod 188 is positioned between the bracket 183 and the connecting plate 181. The shaft 184 and the pins 186 are positioned inside a casing 192 mounted on the connecting plate 181.

Figure 7:
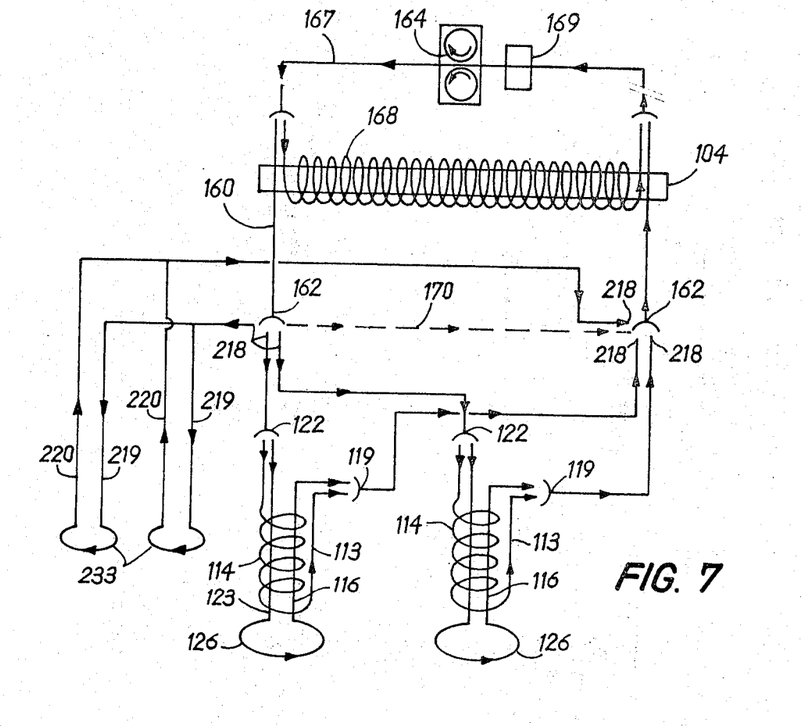
FIG. 7 is a circuit diagram of the cooling system of the machine according to the invention.

FIG. 7 schematically shows the cooling circuit of the machine according to the invention. A pump 164 mounted in the stationary member 103 forces the cooling water into a duct 167. This water is used, on the one hand, to cool the transformer 104 by means of the cooling coil 168, and, on the other hand, to cool the machine according to the invention by supplying one of the fluid tight sheaths 160. The water distributed by the fluid tight sheath 160 is sent in parallel through the orifices 162 and the ducts 218 in the first place to the cooling circuits of the two welding rollers, that is to say, on the one hand, through the helical grooves 113 and 114 which cool the rotating shafts 111 and, on the other hand, through the ducts 126 positioned inside the welding rollers 109, and in the second place, through the cooling circuits of the rear driving rollers, that is to say, through the ducts 219 into the chambers 233. The cooling water introduced through the duct 123 is exhausted through the annular duct 116 whereas that which is introduced through the helical duct 114 is exhausted through the helical duct 113. For each roller, the cooling water which has served its purpose is exhausted through the exhaust duct 119 and returned through two flexible tubes to the ducts 218 and to the fluid tight exhaust jacket 160. The water injected into the cooling chambers 233 is exhausted through the ducts 220 which are connected by flexible tubes to a duct 218. The cooling water which has served its purpose is thus returned to the exhaust jacket 160. The outlet of the exhaust jacket 160 and that of the coil 168 are connected and the heated water is introduced into a cooler 169 from which it is then withdrawn by the pump 164. To balance the temperatures inside the two jackets 160 a by-pass for cooling water is provided between the connecting block of the supply jacket 160 and that of the exhaust jacket 160, this by-pass being indicated in broken lines and assigned reference numeral 170 on FIG. 7. It is not shown on the other figures.

In order to use the welding machine according to the invention which has just been described this machine is placed in position by inserting the flanges 107a–107b between the four drive rollers 171, with the handle 185 in low position, that is to say near the rollers 171, after which the handle 185 is actuated to bring it into high position. During this movement, because of the eccentricity of the pins 186 with respect to the axis of the shaft 184, a pull is exerted on the rods 188 which brings the brackets 182 and the connecting plate 189 together. This gripping movement involves utilization of the elasticity of the electric washers 190. This produces gripping at a predetermined pressure simultaneously between the two pairs of driving rollers 171. If the rollers 171 are worn, the pressure may be easily corrected by adjusting the nut 189 on the threaded end of the rod 188. When, on the contrary, the user wants to separate the rollers 171 it suffices to operate the handle 185, so that the springs 191 expand to separate the two rollers of each pair of drive rollers.

When the machine according to the invention has thus been mounted on a joint to be welded, and the motor 237 is supplied with electric current, this motor rotates the shaft 141 and the helical gears 179 and 205. As has been previously indicated, this results in equal and opposite speeds of rotation for each roller 171 of each pair and for each of the two welding rollers 109. It should be noted that, because of the use of a transmission of the worm screw type, the transmission is in no way disturbed when there is pivotal movement of the two sleeves 173 of a single pair of driving rollers about the shaft 141 or of the two yokes 204 about the shaft 141. Because the axes of the rollers 141 are inclined 4 degrees with respect to a direction perpendicular to the plates 106a–106b, the rolling of the rollers 171 on the flanges 107a, 107b is in a direction oblique to the plates which urges the machine against the plates 106a–106b, the pressure being provided by the engagement of the rollers 180 and 239 on the plates 106a and 106b.

As the machine advances, welding results from the gripping of the two rollers 109 on opposite sides of the flanges 107a, 107b. This gripping action is provided by a hydraulic cylinder 228 when this cylinder is supplied through the duct 233. In effect, the force which the piston 230 exerts is referred by the yokes 229 and 231 to the projections 227 and the sleeve 112. It should be noted that the welding rollers 109, during operation, are free to pivot about the shaft 141, the gripping pressure exerted by the hydraulic cylinder 228 being nevertheless kept constant regardless of the relative movements of the two sleeves 112, so long as the pneumatic pressure supplied by the hydraulic cylinder 228 is maintained through the duct 233. If the supply to the cylinder 228 is reversed, that is to say if it is introduced through the duct 234, the force which the piston exerts is reversed to separate the two sleeves 112 by pivoting the two yokes 204 about the shaft 141. In this position welding no longer takes place, since the welding rollers 109 no longer grip the flanges 107a, 107b. The source of fluid pressure actuating the cylinder 228 is located in the box 105.

When the braids 161 are supplied with electrical current this current passes through the connecting block 216 and reaches the sleeve 112 which is electrically and mechanically connected to the connecting block 216. From the sleeve 112 the current passes to the sleeve 131 and to the shaft 111 and thence to the corresponding welding roller. Welding results from the resistance to the passage of the current between the two rollers 109 in the zone of their points of contact with the flanges 107a, 107b. The welding rollers are cooled by the ducts 126 and the rotating shaft 111 is cooled by the helical ducts 113 and 114. The welding rollers are rotated by the gears 205 and these turn at a speed which corresponds substantially to the speed at which the machine advances so that they roll without sliding along the welded joint and are subjected to very little wear, especially since they are well cooled. The rear driving rollers 171 are also cooled by the water which circulates through the chamber 233, which permits the reduction of their wear to a minimum, even though they are in contact with a zone of the flanges which has just been welded by the passage of the welding rollers 109 thereover.

It is obvious that the flexible cable 102 may contain, on the one hand, two fluid tight ducts 160, and, on the other hand, the electrical wire supplying the motor 237 and the flexible tubes supplying one end or the other of the hydraulic cylinder 223. When two sheets of Invar, each 0.7 mm thick, are to be welded, a tongue 108 of Invar 0.5 mm thick is inserted between two flanges, and it has been found that particularly satisfactory results are obtained by supplying the braids 161 with a current of 5,000 Amperes at 1.5 volts, which current is so modulated as to produce 20 millisecond pulses of current separated by rest periods of 20 milliseconds. Under these conditions a gripping force between the welding rollers 109 of the order of 120 Kg is exerted and a satisfactory continuous weld may be produced by advancing the welding machine along the joint at a speed of 1.8 meters per minute. The supply of cooling water to the fluid tight jacket 160 is at the rate of 25 liters per minute. It has been found that, under these conditions of use, the machine, while following closely along the line to be welded, causes no abrasion of the copper of the welding rollers 109.

It will of course be appreciated that the embodiment which has just been described has been given purely by way of example and may be modified as to detail without thereby departing from the basic principles of the invention.

What is claimed is:

1. Electrical welding machine adapted to weld flanges projecting transversely from adjacent sheets together, which machine comprises at least two welding rollers adapted to be positioned opposite each other on opposite sides of the flanges to be welded, said rollers being mounted to turn on shafts substantially perpendicular to the sheets to be welded, each of the rollers of a pair being mounted on one of a pair of relatively movable jaws, said jaws being mounted to pivot about a common axis to provide a gripping zone between the welding rollers, and two pairs of driving rollers, the individual rollers of each pair being adapted to be positioned on opposite sides of the flanges to be welded and the two pairs of driving rollers being positioned on opposite sides of the welding rollers, said driving rollers being mounted to rotate about shafts inclined in the direction of travel of the machine with respect to a direction perpendicular to the sheets to be assembled, and means for rotating said driving roller shafts at the same speed in opposite directions, each of the two driving rollers of each pair being fixed to one of two relatively movable jaws, said last mentioned jaws being mounted to swing about a common axis to form a gripping zone between said driving rollers.

2. Machine as claimed in claim 1 in which the welding rollers are mounted to rotate freely about their axes.

3. Machine as claimed in claim 1 comprising means for rotating said welding rollers at a peripheral speed substantially equal to or slightly less than that at which said driving rollers are driven.

4. Machine as claimed in claim 1 which is supplied through a transformer with an intermittent current.

5. Machine as claimed in claim 4 in which the intervals of time during which the current is supplied and cut off are of substantially equal length and last for about 20 milliseconds.

6. Machine as claimed in claim 1 in which the inclinations of the axes of the driving rollers to the direction perpendicular to the sheets to be welded are equal.

7. Machine as claimed in claim 1 in which the axes about which the jaws carrying the driving rollers and the welding rollers pivot are the same and parallel to the sheets to be welded.

8. Machine as claimed in claim 1 comprising supporting rollers which support said machine on the sheets to be welded and which turn about axes parallel to the sheets and perpendicular to the flanges to be welded.

9. Machine as claimed in claim 8 in which the axis about which the jaws carrying the drive rollers and the welding rollers pivot is a shaft rotatably driven from an electric and connected to drive both said drive and welding rollers.

10. Machine as claimed in claim 9 in which the two drive rollers of each pair are driven through a worm screw which cooperates with two gears which are inclined to compensate for the inclination of the driving rollers, each of said inclined gears driving one of the driving rollers of each pair.

11. Machine as claimed in claim 1 in which the driving rollers are caused to grip the flanges to be welded by a manually operable eccentric device which comprises elastic means for ensuring resilient gripping, a spring being provided to separate the rollers when gripping ceases.

12. Machine as claimed in claim 12 in which the eccentric device operates simultaneously on the two pairs of driving rollers.

13. Machine as claimed in claim 1 in which the two welding rollers are urged against the flanges to be welded by pneumatic or hydraulic control means.

14. Machine as claimed in claim 13 in which the gripping of the welding rollers is controlled by a simple hydraulic jack and a spring serving to separate the welding rollers when the gripping pressure is relieved, or by means of a double-acting hydraulic jack.

15. Machine as claimed in claim 1, in which each welding roller is peripherally cooled by an internal duct, the cooling circuits of the welding rollers being connected in parallel with a general cooling circuit for the machine.

16. Machine as claimed in claim 1 in which the shafts carrying the welding roller are provided with internal cooling ducts electrical contact between said shafts and stationary sleeves in which said shafts turn is provided by a rotating cylindrical seal.

17. Machine as claimed in claim 1 comprising a pair of driving rollers behind the welding rollers, which pair is provided with a cooling circuit.

18. Machine as claimed in claim 18 in which the cooling circuit of the rear driving wheels comprises a water jacket encircling the axis of each of said rollers for a part of its length.

19. Machine as claimed in claim 2 in which the shaft on which each welding roller is mounted is itself mounted in a sleeve attached to a jaw in the form of a yoke, a central part of the yoke being provided with bearings receiving the shaft on which the jaws are pivotally mounted and the arms of the yoke being provided with means to provide relative displacement of said jaws.

20. Machine as claimed in claim 19, in which both yokes have a common median plane perpendicular to their rotating shaft, plane on each side of which they each support a pulley, which shaft is perpendicular to said plane, both pulleys disposed on the same side of the median plane cooperating with a third pulley carried by a slider bar and operating with this third pulley as a pulley-block.

21. Machine as claimed in claim 20, in which a pneumatic means adjusts the relative position of said slidder bar and the rotating shaft.

22. Machine as claimed in claims 3 in which the shaft on which each welding roller is mounted is journalled in a sleeve carried by one of said jaws, one of said sleeves being connected to the piston and the other to the cylinder of a fluid pressure-operated jack.

23. Machine as claimed in claim 3 in which said welding rollers are driven by gears fixed to the shafts about which they rotate, said gear being positioned on opposite sides of a worm screw in alignment with the common axis about which the jaws carrying said welding rollers pivot.

* * * * *

UNITED STATES PATENT OFFICE
CERTIFICATE OF CORRECTION

Patent No. 3,777,107          Dated 4 December 1973

Inventor(s) PIERRE JEAN and MARCEL NIAS

It is certified that error appears in the above-identified patent and that said Letters Patent are hereby corrected as shown below:

Claim 12, line 1, cancel "12" (second occurence) and substitute --11--.

Claim 18, line 1, cancel "18" (second occurence) and substitute --17--.

Signed and sealed this 17th day of September 1974.

(SEAL)
Attest:

McCOY M. GIBSON JR.
Attesting Officer

C. MARSHALL DANN
Commissioner of Patents